United States Patent
Jeong et al.

(10) Patent No.: US 8,807,652 B2
(45) Date of Patent: Aug. 19, 2014

(54) BACK RECLINING APPARATUS INTERLOCKING WITH SEAT CUSHION FOR VEHICLE

(75) Inventors: Chan Ho Jeong, Seoul (KR); Byung Jae Lee, Gunpo-si (KR); Sang Wook Yu, Seoul (KR); Mi Sun Kwon, Seoul (KR); Seon Chae Na, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 541 days.

(21) Appl. No.: 13/173,648

(22) Filed: Jun. 30, 2011

(65) Prior Publication Data
US 2012/0139314 A1 Jun. 7, 2012

(30) Foreign Application Priority Data
Dec. 7, 2010 (KR) ................. 10-2010-0124504

(51) Int. Cl.
*B60N 2/48* (2006.01)
(52) U.S. Cl.
USPC ............. 297/378.12; 297/354.1; 297/378.14; 297/344.11; 297/332
(58) Field of Classification Search
USPC ........ 297/354.1, 378.12, 378.14, 367 R, 334, 297/344.11, 344.15, 331, 332
See application file for complete search history.

(56) References Cited

U.S. PATENT DOCUMENTS

| | | | | |
|---|---|---|---|---|
| 5,395,116 A | * | 3/1995 | Blaakman | 473/224 |
| 6,851,753 B2 | * | 2/2005 | Akaike et al. | 297/344.17 |
| 7,281,766 B2 | * | 10/2007 | Fujita et al. | 297/378.12 |
| 7,350,867 B2 | * | 4/2008 | Park | 297/378.12 |
| 8,038,217 B2 | * | 10/2011 | Yamagishi et al. | 297/341 |
| 8,047,610 B2 | * | 11/2011 | Yamagishi | 297/341 |
| 8,152,240 B2 | * | 4/2012 | Yamada et al. | 297/321 |
| 8,256,844 B2 | * | 9/2012 | Yamazaki et al. | 297/378.12 |
| 8,366,194 B2 | * | 2/2013 | Yamamoto | 297/284.11 |
| 8,376,459 B2 | * | 2/2013 | Kumazaki et al. | 297/341 |
| 8,388,054 B2 | * | 3/2013 | Sayama | 297/15 |
| 8,544,956 B2 | * | 10/2013 | Park et al. | 297/326 |
| 8,596,721 B2 | * | 12/2013 | Ozawa | 297/344.15 |

FOREIGN PATENT DOCUMENTS

| | | |
|---|---|---|
| JP | 56-039928 A | 4/1981 |
| JP | 01-214308 A | 8/1989 |
| KR | 1998-022269 U | 7/1998 |
| KR | 10-0778590 B1 | 11/2007 |
| KR | 10-0821100 B1 | 4/2008 |
| KR | 10-2008-0091262 A | 10/2008 |
| KR | 10-2009-0072204 A | 7/2009 |

* cited by examiner

*Primary Examiner* — Chi Q Nguyen
(74) *Attorney, Agent, or Firm* — Morgan, Lewis & Bockius LLP

(57) ABSTRACT

A back reclining apparatus interlocking with a seat cushion for a vehicle may include a back frame including a main frame fixed to a vehicle body and a reclining frame that may be selectively reclined around a reclining hinge on an inner surface of the main frame, a reclining locking unit connected to the main frame and the reclining frame to selectively release locking of the main frame and the reclining frame, a cushion locking unit selectively releasing locking of a cushion frame and the reclining frame, and a cushion sliding unit connected between the cushion frame and a floor panel to interlock with the reclining frame and to make the cushion frame move to slide forward when the locking of the reclining locking unit may be released and the reclining frame may be reclined around the reclining hinge.

8 Claims, 14 Drawing Sheets

US 8,807,652 B2

BACK RECLINING APPARATUS INTERLOCKING WITH SEAT CUSHION FOR VEHICLE

CROSS-REFERENCE TO RELATED APPLICATION

The present application claims priority to Korean Patent Application No.10-2010-0124504, filed on Dec. 7, 2010 in the Korean Intellectual Property Office, the entire contents of which is incorporated herein for all purposes by this reference.

BACKGROUND OF THE INVENTION

1. Field of the invention

The present invention relates generally to a seat for a vehicle, and more particularly, to a back reclining apparatus interlocking with a seat cushion for a vehicle, which makes a seat cushion interlock with the seat back and move to slide forward when a seat back is reclined.

2. Description of Related Art

In general, a rear seat for a middle size or sub-full size vehicle, unlike a front seat, is not provided with a seat back reclining apparatus, and a passenger is unable to adjust a seat back at a desired angle to cause inconvenience in use.

In order to supplement this, in the case of a full size vehicle, when a seat back is reclined, a seat cushion interlocks with the seat back and moves forward to improve the customer's convenience. However, in the case of a back reclining apparatus that interlocks with a cushion of a full size vehicle in the related art, it is driven by an expensive motorized system, and thus it is difficult to apply such a back reclining apparatus to middle size and sub-full size vehicles.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a back reclining apparatus interlocking with a seat cushion for a vehicle, which can make a seat cushion interlock with the seat back and move to slide forward by applying a mechanical interlocking mechanism when a seat back is reclined, and thus reduce the manufacturing cost in comparison to a motorized back reclining apparatus.

In an aspect of the present invention, the back reclining apparatus interlocking with a seat cushion for a vehicle, may include a back frame including a main frame fixed to a vehicle body and a reclining frame that may be selectively reclined around a reclining hinge on an inner surface of the main frame, a reclining locking unit connected to the main frame and the reclining frame to selectively release locking of the main frame and the reclining frame, a cushion locking unit selectively releasing locking of a cushion frame and the reclining frame, and a cushion sliding unit connected between the cushion frame and a floor panel to interlock with the reclining frame and to make the cushion frame move to slide forward when the locking of the reclining locking unit may be released and the reclining frame may be reclined around the reclining hinge.

The reclining locking unit may include a reclining lever provided on a side of the back frame, a reclining cable lever rotatably provided on the reclining frame and connected to the reclining lever with a first reclining cable, and a locking pin connected to the reclining cable lever with a second reclining cable and inserted into a first guide bracket that may be integrally formed with the main frame and a second guide bracket that may be integrally formed with the reclining frame to maintain or release locking of the first guide bracket and the second guide bracket, wherein when the reclining lever may be operated, the first reclining cable rotates the reclining cable lever, and the second reclining cable that may be connected to the reclining cable lever pulls the lock pin, so that the locking of the first guide bracket and the second guide bracket may be maintained or released.

The locking pin moves in an axis direction in accordance with the operation of the reclining lever, and may include a locking protrusion formed on an outer circumference of the lock pin and inserted into locking holes formed on the first guide bracket and the second guide bracket, respectively, to maintain the locking of the first guide bracket and the second guide bracket, and a pin body formed with a diameter that may be smaller than those of the locking protrusion and the locking holes and located in the locking holes when the locking pin moves in a locking release direction to release the locking of the first guide bracket and the second guide bracket.

A locking hole of the first guide bracket may be formed of a slot.

The cushion sliding unit may include a first sliding portion including a first rail integrally installed on an upper surface of the floor panel, and a first slider integrally installed on a bottom surface of the cushion frame to move straight in forward/backward directions along the first rail, and a second sliding portion including a second rail arranged in the rear of the first sliding portion and integrally installed on the upper surface of the floor panel and having an upwardly inclined slot formed thereon in the forward direction, and a second slider integrally installed on the bottom surface of the cushion frame and having a protrusion formed thereon to be coupled with and guided along the slot.

The cushion sliding unit further may include a return spring having one end connected to the first rail and the other end connected to the first slider, wherein when the reclining locking unit may be operated to restore the back frame, the first slider moves straight in the backward direction along the first rail by a restoring force of the return spring, and thus the cushion frame may be restored.

The cushion locking unit may include a cushion locking bar formed at a rear end of the cushion frame, and a cushion locking bracket provided at a lower end of the reclining frame to selectively lock with the cushion locking bar.

The cushion locking unit further may include a folding operation portion folding the back frame around a back folding hinge by releasing locking of the cushion locking bracket from the cushion locking bar through operation of the cushion locking bracket.

The folding operation portion may include a spring release that may be pulled backward when a folding lever may be operated, a folding release bracket pivotally connected to the spring release through a bracket shaft to rotate upward together with the bracket shaft when the spring release may be pulled backward, and a folding wire having one end connected to the folding release bracket and the other end connected to the cushion locking bracket.

As described above, according to the back reclining apparatus interlocking with a seat cushion for a vehicle according to an embodiment of the present invention, the seat cushion interlocks with the seat back and moves to slide forward by applying the mechanical interlocking mechanism when the seat back is reclined, and thus the manufacturing cost is reduced in comparison to the motorized back reclining apparatus.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
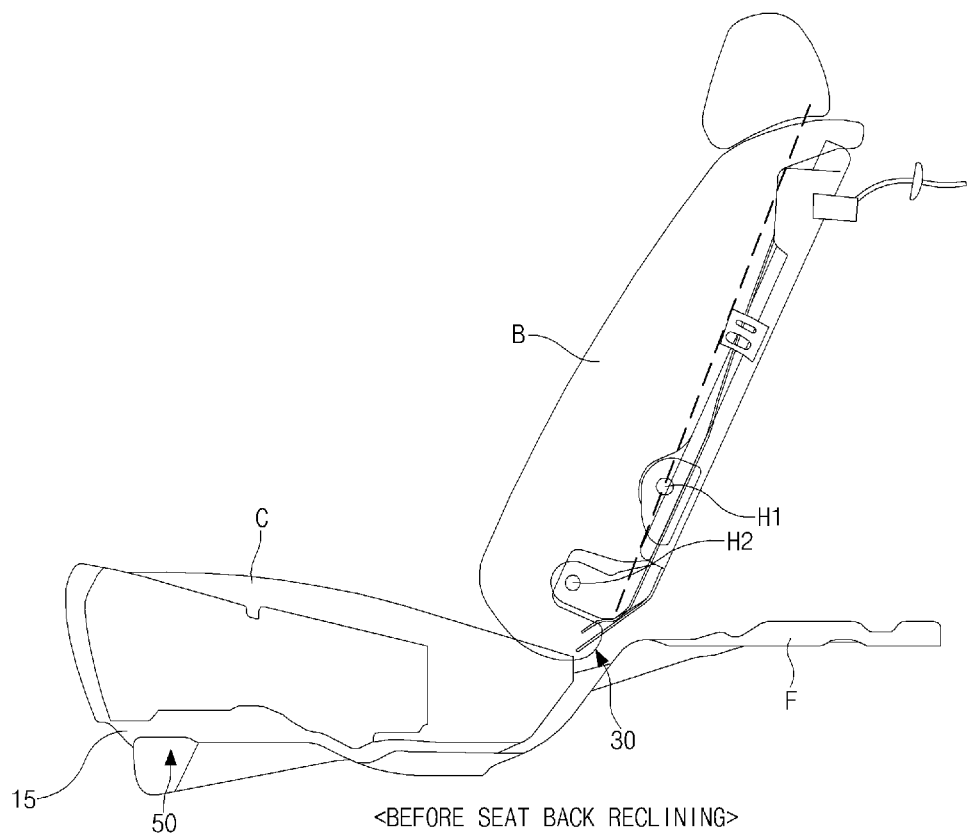
FIG. 1 is a side view illustrating a vehicle seat on which a back reclining apparatus interlocking with a seat cushion is installed in a state where a seat back of the vehicle seat is reclined according to an exemplary embodiment of the present invention.
Figure 2:
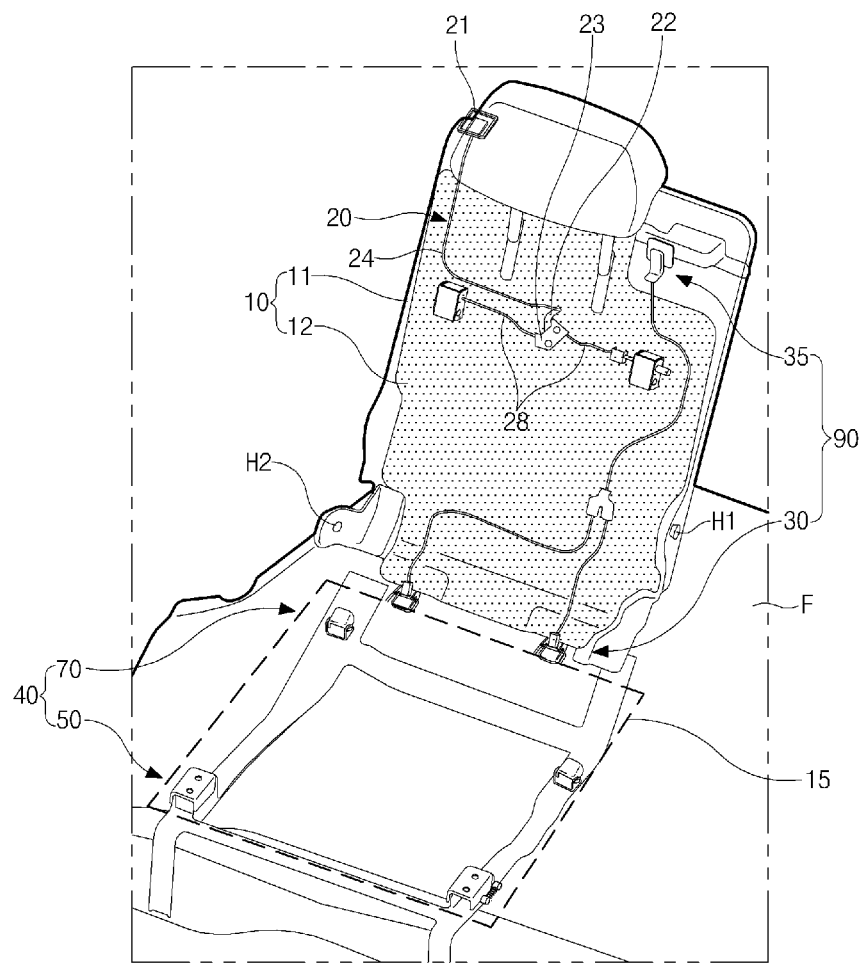
FIG. 2 is a perspective view illustrating a back reclining apparatus interlocking with a seat cushion according to an exemplary embodiment of the present invention.
Figure 3:
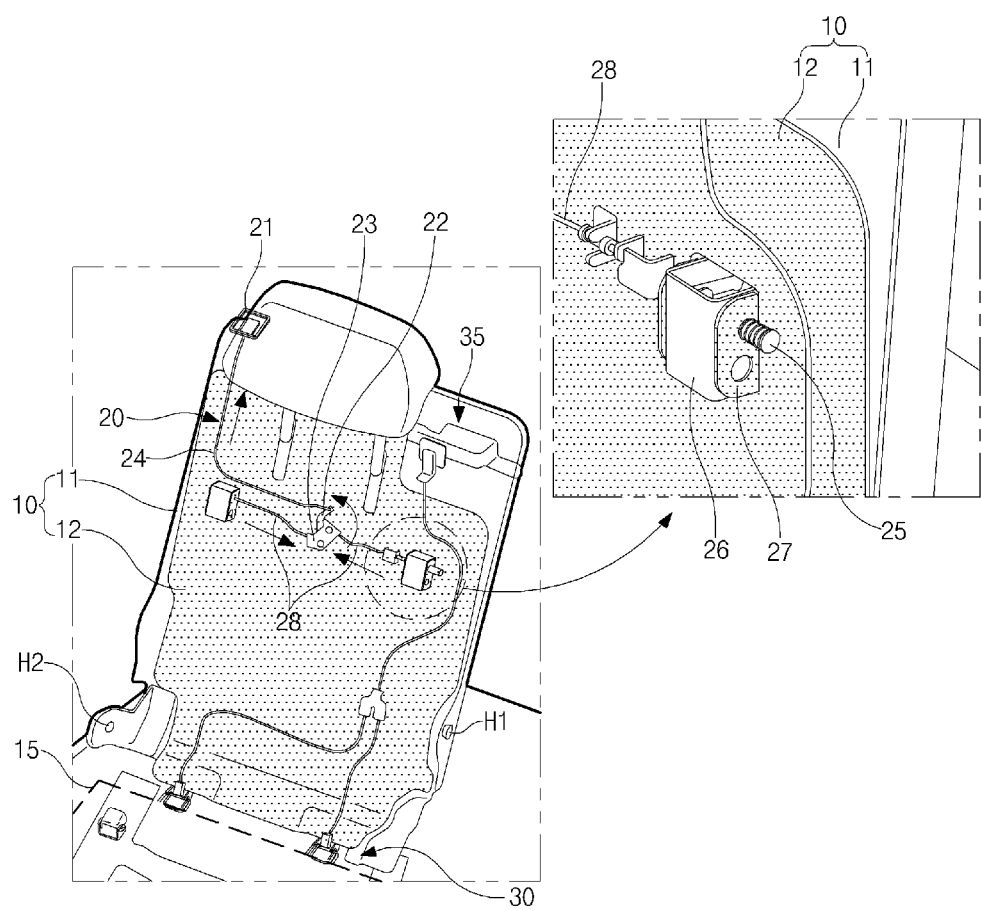
FIG. 3 is an enlarged perspective view of a reclining locking unit of FIG. 2.
Figure 4:
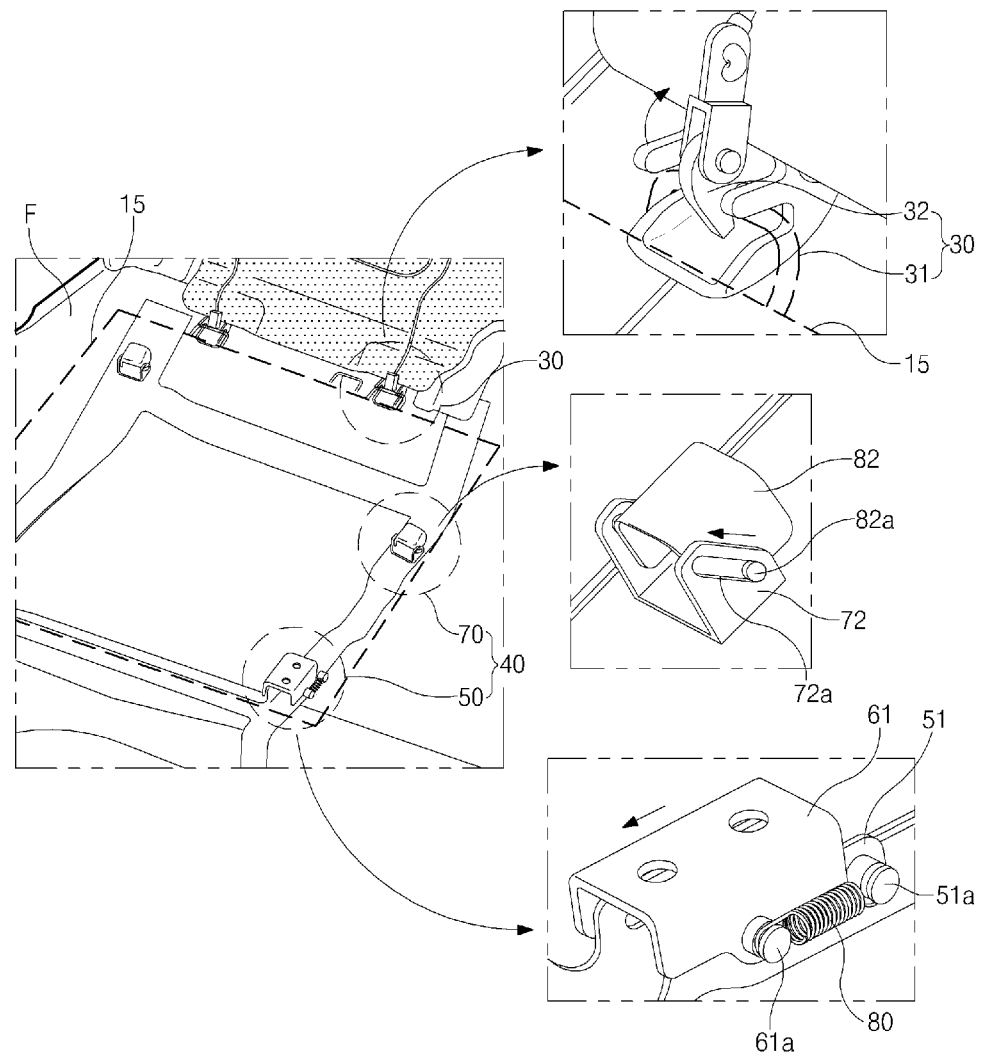
FIG. 4 is an exploded perspective view of a cushion locking unit and a cushion sliding unit of FIG. 2.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A back reclining apparatus interlocking with a seat cushion for a vehicle according to an exemplary embodiment of the present invention is characterized in that a seat cushion interlocks with the seat back and moves to slide forward when a seat back is reclined.

The back reclining apparatus interlocking with a seat cushion for a vehicle according to an exemplary embodiment of the present invention, as illustrated in FIGS. 1 to 4, includes a back frame 10 briefly including a main frame 11 and a reclining frame 12, a reclining locking unit 20 maintaining or releasing locking of the main frame 11 and the reclining frame 12, a cushion locking unit 90 maintaining or releasing locking of the reclining frame 12 and a cushion frame 15, and a cushion sliding unit 40 making the cushion frame 15 move to slide forward when the back frame 10 is reclined.

Figure 8:
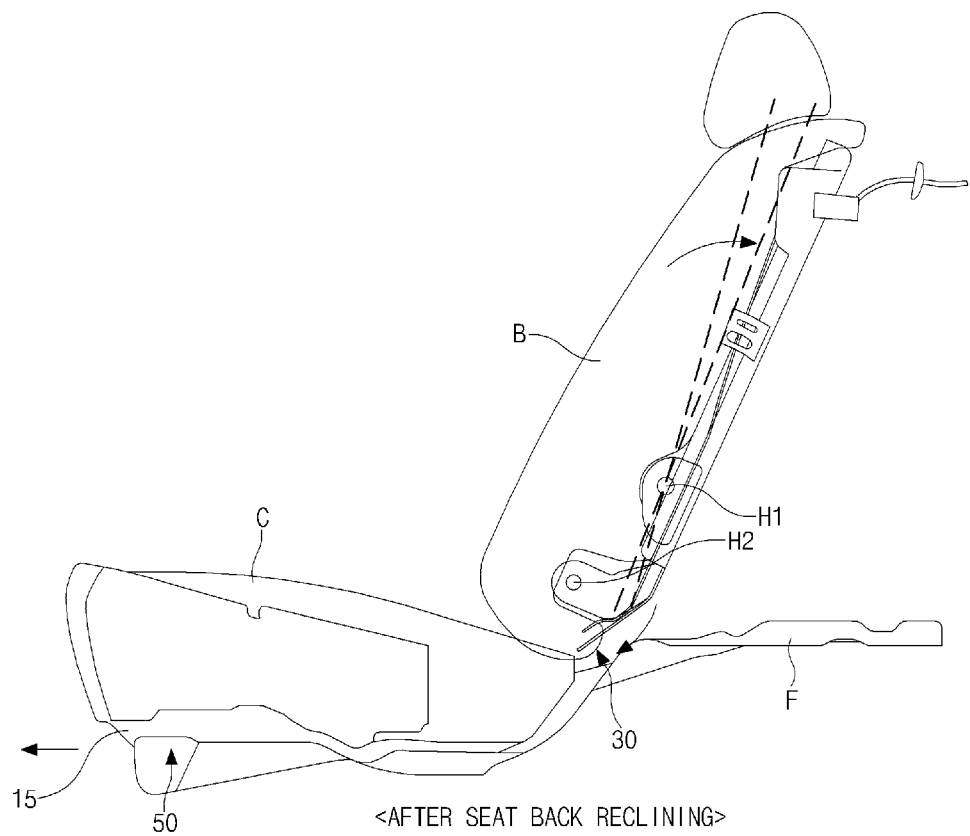
FIG. 8 is a side view illustrating a state where a seat back is reclined in the process of FIGS. 5 to 7.

The back frame 10 includes the main frame 11 fixed to a vehicle body, and the reclining frame 12 integrally installed on back pad to be reclined around a reclining hinge H1 on an inner surface of the main frame 11. When the locking of the main frame 11 and the reclining frame 12 is released by the reclining locking unit 20, the reclining frame 12 can be reclined backward toward the main frame 11 around the reclining hinge H1 (see FIG. 8).

On the other hand, on a side surface of the main frame 11, a back folding hinge H2 is provided to enable the back frame 10 to be folded toward a seat cushion C.

The reclining locking unit 20 is connected to the main frame 11 and the reclining frame 12 and serves to maintain or release the locking of the main frame 11 and the reclining frame 12. That is, before a passenger reclines the seat back B (initial state), the reclining locking unit 20 maintains the locking of the main frame 11 and the reclining frame 12, and when the locking of the main frame 11 and the reclining frame 12 is released, the reclining frame 12 is rotated around the reclining hinge H1 to enable the passenger to recline the seat back B.

For this, the reclining locking unit 20 briefly includes a reclining lever 21, reclining cable levers 22 and 23, and a locking pin 25.

The reclining lever 21 is provided at an upper end of the back frame 10, and is connected to the reclining cable levers 22 and 23 by a first reclining cable 24. Accordingly, if the passenger operates the reclining lever 21, the first reclining cable 24 is pulled upward, and thus the reclining cable levers 22 and 23 can be rotated counterclockwise.

The reclining cable levers are rotatably provided on the inner side surface of the reclining frame 12, and includes the first reclining cable lever 22 connected to the first reclining cable 24, and the second reclining cable lever 23 connected to the locking pin 25 and the second reclining cable 28 to interlock with the first reclining cable lever 22 to be rotated. If the first reclining cable lever 22 and the second reclining cable lever 23 interlock with each other and are rotated counterclockwise by the operation of the reclining lever 21, the second reclining cable 28 pulls the locking pin 25 in the axis direction.

One end of the locking pin 25 is connected to the second reclining cable 28, and the locking pin 25 is inserted into a first guide bracket 26 that is integrally formed with the main frame 11 and a second guide bracket 27 that is integrally formed with the reclining frame 12 to maintain or release the locking of the first guide bracket 26 and the second guide bracket 27.

The second guide bracket 27 is projected to the outside of the reclining frame 12 through a hole formed on the reclining frame 12, and both side surfaces of the second guide bracket 27 are in contact with the first guide bracket 26. In this case, on the first guide bracket 26 and the second guide bracket 27, locking holes 26a and 27a for locking the locking pin 25 are formed.

Figure 5:
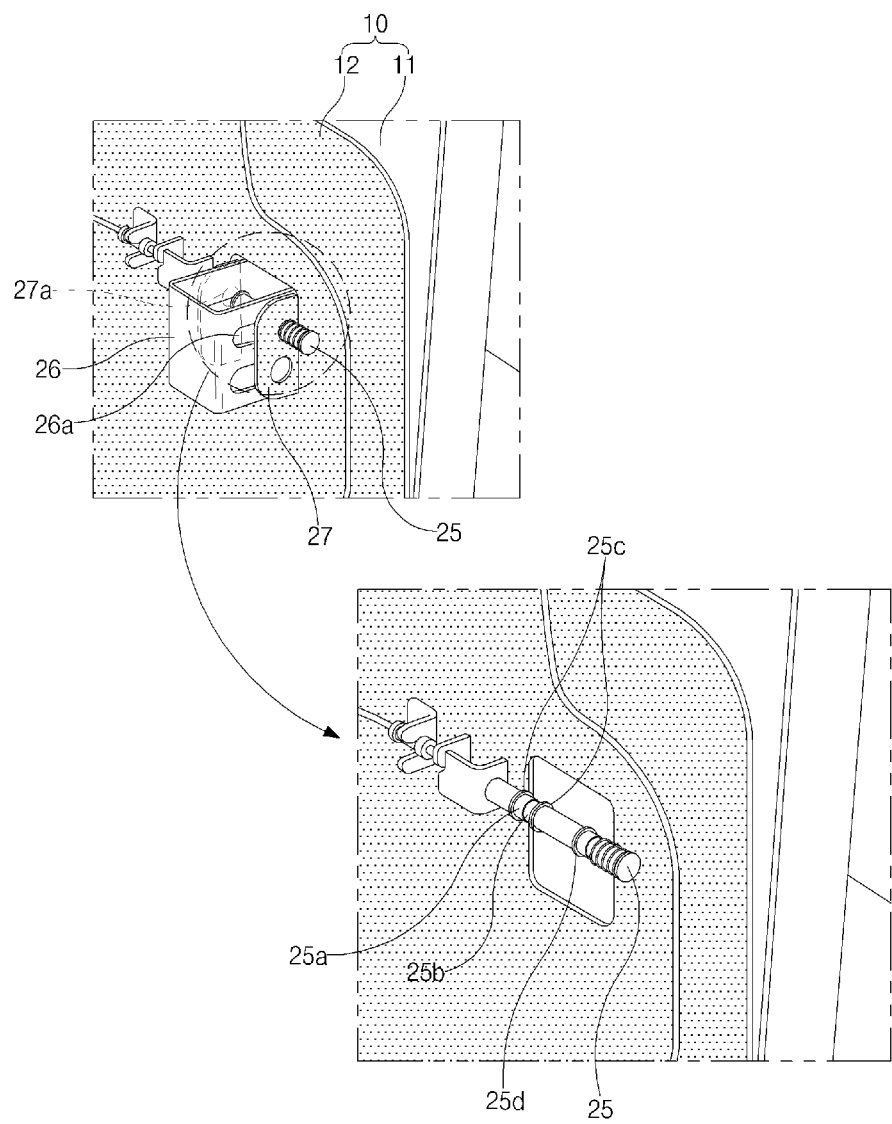
FIG. 5 is a perspective view illustrating a state where locking of a reclining locking unit of FIG. 3 is released and a reclining frame is reclined.

On the outer circumference of the locking pin 25, as illustrated in FIG. 5, a locking protrusion 25a and a pin body 25b having a diameter that is smaller than those of the locking protrusion 25a and the locking holes 26a and 27a are formed.

In this case, the locking protrusion 25a is formed with almost the same size as that of the locking holes 26a and 27a, and is inserted into the locking holes 26a and 27a formed on the guide brackets 26 and 27, respectively, to maintain the locking of the first guide bracket 26 and the second guide bracket 27. The pin body 25b is formed with a diameter that is smaller than those of the locking protrusion 25a and the locking holes 26a and 27a, and is positioned in the locking holes 26a and 27a when the locking pin 25 moves along the axis in the locking release direction, so that the locking of the first guide bracket 26 and the second guide bracket 27 is released. As described above, if the locking of the first guide bracket 26 and the second guide bracket 27 is released, the reclining frame 12 can be reclined around the reclining hinge H1 against the back frame 10.

Here, on the circumference of the locking pin 25, a pair of first pin guides 25c, which is larger than the diameter of the locking holes 26a and 27a and between which the locking protrusion 25a and the pin body 25b are positioned, is formed to project, and guides the movement of the locking pin 25 when the locking pin 25 moves along the axis.

On the other hand, on the circumference of the locking pin 25, a second pin guides 25d is formed to project in a position that is apart from the first pin guide 25c, and guides the locking pin 25 when the locking pin 25 moves along the locking hole 26a.

Here, the locking hole 26a of the first guide bracket 26 is formed as an elongated hole so that it does not interfere with the locking pin 25 when the reclining frame 12 is reclined.

The cushion sliding unit 40 is connected between the cushion frame 15 and a floor panel F, and interlocks with the cushion frame 15 and moves to slide forward when the back frame 10 is reclined.

Here, the cushion sliding unit 40 includes a first sliding portion 50 and a second sliding portion 70 arranged in the rear of the first sliding portion 50.

Figure 6:
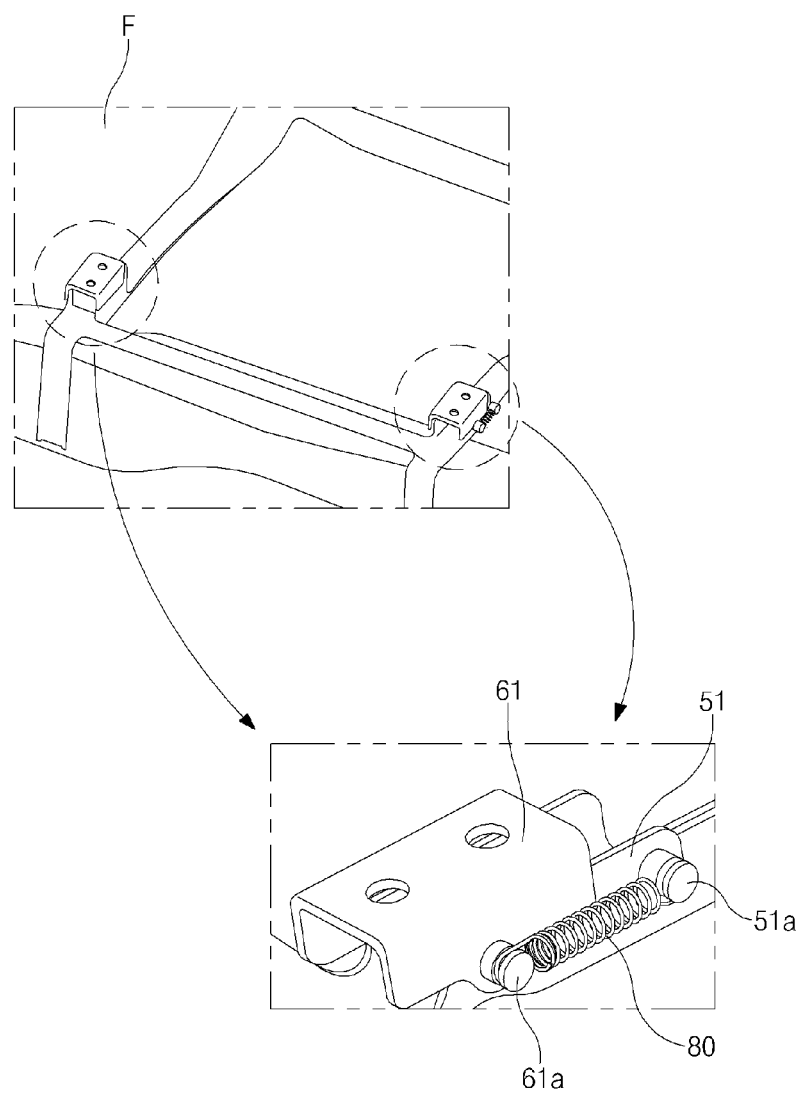
FIGS. 6 and 7 are perspective views illustrating a state where a cushion frame is move forward by a first sliding portion and a second sliding portion as a reclining frame is reclined as illustrated in FIG. 5.

The first sliding portion 50, as illustrated in FIG. 6, includes a first rail 51 integrally installed on an upper surface of the floor panel F, and a first slider 61 integrally installed on a bottom surface of the cushion frame 15 to move straight in forward/backward directions along the first rail 51.

In this case, on side surfaces of the first rail 51 and the first slider 61, support protrusions 51a and 61a are formed to project, respectively. One end of a return spring 80 is connected to the support protrusion 51a of the first rail 51, and the other end of the return spring 80 is connected to the support protrusion 61a of the first slider 61.

If the reclining locking unit 20 is operated to restore the reclining frame 12 which has been reclined, the first slider 61 moves to slide backward along the first rail 51 by a restoring force of the return spring 80, and thus the cushion frame 15 is restored to its original state.

Figure 7:
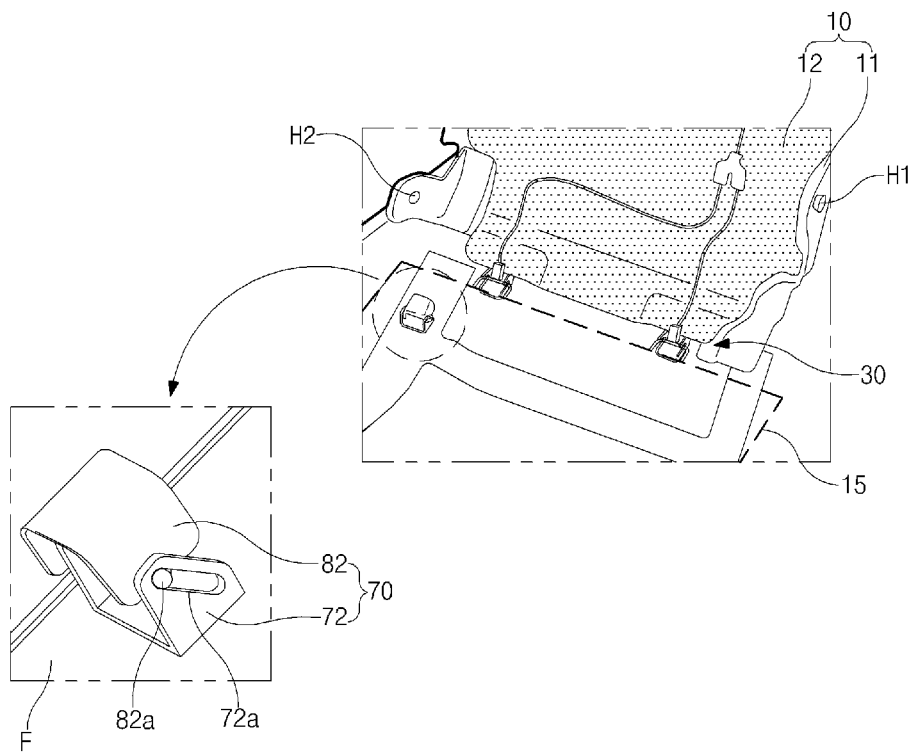

The second sliding portion 70 serves to move the cushion frame 15 forward together with the first sliding portion 50, and as illustrated in FIG. 7, includes a second rail 72 integrally installed on the upper surface of the floor panel F and having an upwardly inclined slot 72a formed thereon in the forward direction, and a second slider 82 integrally installed on the bottom surface of the cushion frame 15 and having a protrusion 82a formed thereon to be guided along the slot 72a. If the seat back B is reclined, the protrusion 82a of the second slider 82 moves upward along the direction of the slot 72a of the second rail 72, and the cushion frame 15 can move forward.

The cushion locking unit 90 includes a cushion locking portion 30, and a folding operation portion 35 making the back frame 10 foldable around the back folding hinge H2 by releasing the locking of the cushion locking portion 30.

The cushion locking portion 30 connects the rear end of the cushion frame 15 to the lower end of the reclining frame 12 so that the reclining frame 12 interlocks with the cushion frame 15 and moves to slide forward when the reclining frame 12 is reclined around the reclining hinge H1.

In this case, the cushion locking portion 30 includes a cushion locking bar 31 formed at the rear end of the cushion frame 15, and a cushion locking bracket 32 provided at the lower end of the reclining frame 12 to lock with the cushion locking bar 31.

Figure 9:
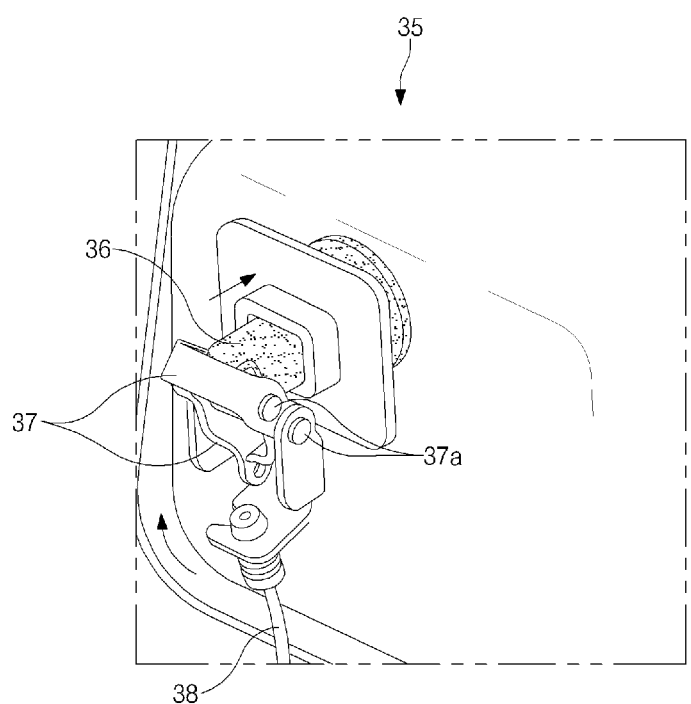
FIG. 9 is a perspective view illustrating a folding operation portion of FIG. 2.
Figure 10:
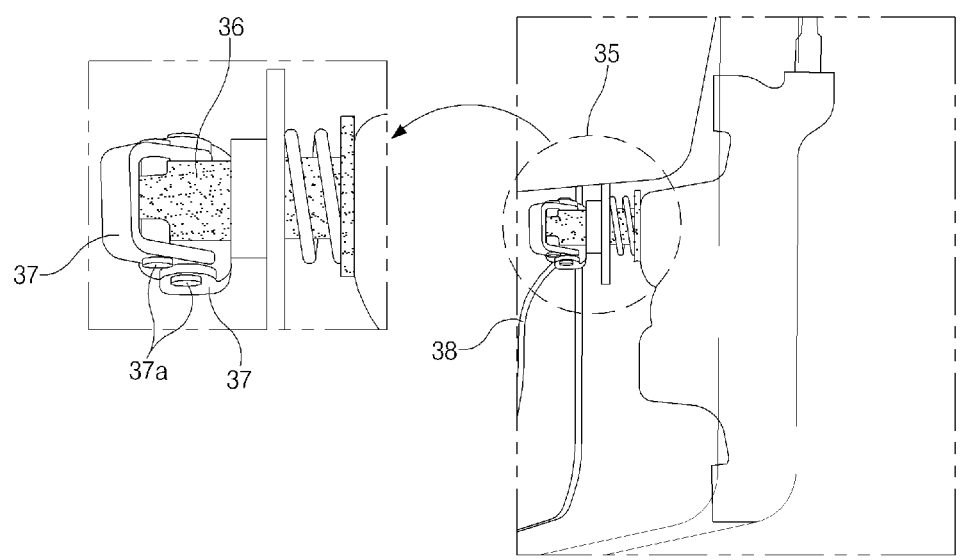
FIG. 10 is a plan view of FIG. 9.

The folding operation portion 35 operates the back frame 10 to be folded around the back folding hinge H2 by releasing the locking of the cushion frame 15 and the back frame 10, and as illustrated in FIGS. 9 and 10, includes a spring release 36 connected to a folding lever, a folding release bracket 37 interlocking with the spring release 36, and a folding wire 38 connected to the folding release bracket 37 and the cushion locking bracket 32.

The spring release 36 is connected to the folding release bracket 37 by a bracket shaft 37a, and if the folding lever is operated, the spring release 36 is pulled backward to rotate the bracket shaft 37a. Accordingly, the folding release bracket 37 that is connected to the bracket shaft 37a is rotated upward together with the bracket shaft 37a, and thus the folding wire 38 is pulled upward.

Figure 11:
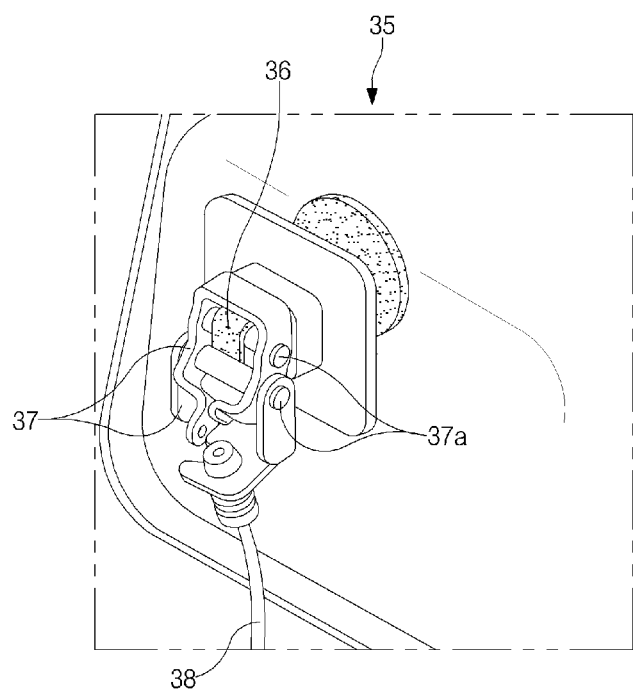
FIG. 11 is a perspective view illustrating a state where a folding operation portion of FIG. 8 is operated in order to fold a seat back.
Figure 12:
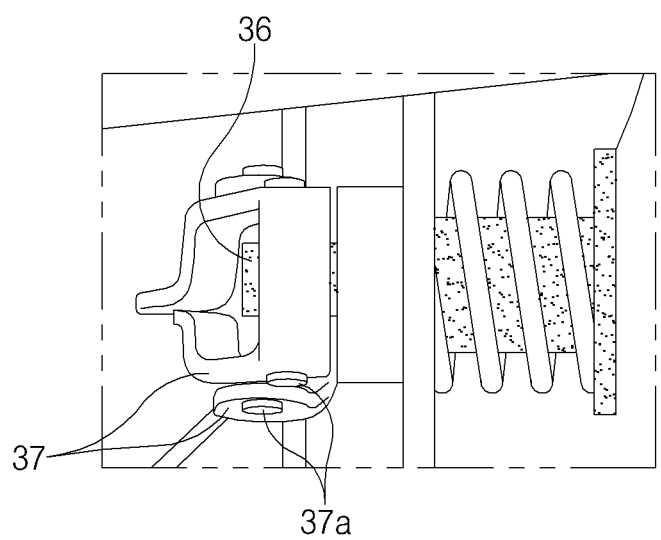
FIG. 12 is a plan view of FIG. 11.
Figure 13:
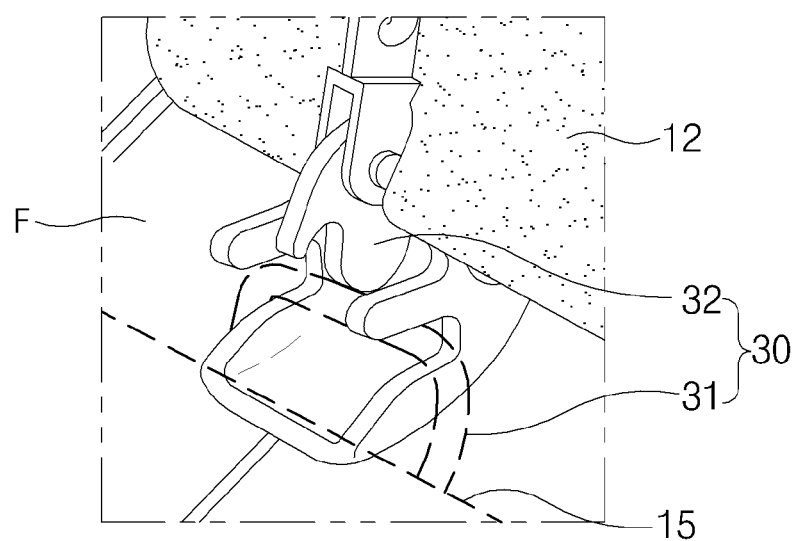
FIG. 13 is a perspective view illustrating a state where a cushion locking bracket is rotated by a folding wire of FIG. 11 and locking with a cushion locking bar is released.
Figure 14:
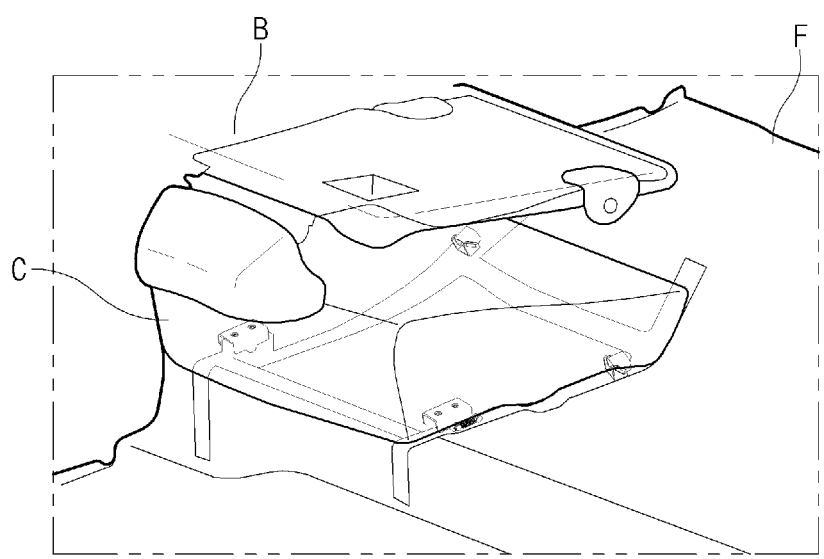
FIG. 14 is a perspective view illustrating a state where a seat back of FIG. 8 is folded.

One end of the folding wire 38 is connected to the folding release bracket 37, and the other end thereof is connected to the cushion locking bracket 32. If the folding lever is operated and the folding wire 38 is pulled upward, the cushion locking bracket 32 is rotated to make the locking of the cushion locking bracket 32 released from the cushion locking bar 31 (see FIGS. 11 to 13). Accordingly, the seat back B can be folded to the upper part of the seat cushion C as illustrated in FIG. 14.

According to the back reclining apparatus as constructed above according to an exemplary embodiment of the present invention, the seat cushion C interlocks with the seat back B and moves to slide through application of the mechanical interlocking mechanism when the seat back B is reclined, and thus the manufacturing cost is reduced in comparison to the motorized back reclining apparatus.

For convenience in explanation and accurate definition in the appended claims, the terms "upper", "lower", "inner" and "outer"are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A back reclining apparatus interlocking with a seat cushion for a vehicle, comprising:
   a back frame including a main frame provided on the seat cushion and a reclining frame that is selectively reclined around a reclining hinge on an inner surface of the main frame;
   a reclining locking unit connected to the main frame and the reclining frame to selectively release locking of the main frame and the reclining frame;
   a cushion locking unit selectively releasing locking of a cushion frame and the reclining frame; and
   a cushion sliding unit connected between the cushion frame and a floor panel to interlock with the reclining frame and to make the cushion frame move to slide forward when the locking of the reclining locking unit is released and the reclining frame is reclined around the reclining hinge;
   wherein the reclining locking unit includes:
      a reclining lever provided on a side of the back frame;
      a reclining cable lever rotatably provided on the reclining frame and connected to the reclining lever with a first reclining cable; and
      a locking pin connected to the reclining cable lever with a second reclining cable and inserted into a first guide bracket that is integrally formed with the main frame and a second guide bracket that is integrally formed with the reclining frame to maintain or release locking of the first guide bracket and the second guide bracket;
   wherein when the reclining lever is operated, the first reclining cable rotates the reclining cable lever, and the second reclining cable that is connected to the reclining cable lever pulls the lock pin, so that the locking of the first guide bracket and the second guide bracket is maintained or released.

2. The back reclining apparatus according to claim 1, wherein the locking pin moves in an axis direction in accordance with the operation of the reclining lever, and includes:
   a locking protrusion formed on an outer circumference of the lock pin and inserted into locking holes formed on the first guide bracket and the second guide bracket, respectively, to maintain the locking of the first guide bracket and the second guide bracket; and
   a pin body formed with a diameter that is smaller than those of the locking protrusion and the locking holes and located in the locking holes when the locking pin moves in a locking release direction to release the locking of the first guide bracket and the second guide bracket.

3. The back reclining apparatus according to claim 1, wherein a locking hole of the first guide bracket is formed of a slot.

4. The back reclining apparatus according to claim 1, wherein the cushion sliding unit includes:
   a first sliding portion including a first rail integrally installed on an upper surface of the floor panel, and a first slider integrally installed on a bottom surface of the cushion frame to move straight in forward/backward directions along the first rail; and
   a second sliding portion including a second rail arranged in the rear of the first sliding portion and integrally installed on the upper surface of the floor panel and having an upwardly inclined slot formed thereon in the forward direction, and a second slider integrally installed on the bottom surface of the cushion frame and having a protrusion formed thereon to be coupled with and guided along the slot.

5. The back reclining apparatus according to claim 4, wherein the cushion sliding unit further includes a return spring having one end connected to the first rail and the other end connected to the first slider,
   wherein when the reclining locking unit is operated to restore the back frame, the first slider moves straight in the backward direction along the first rail by a restoring force of the return spring, and thus the cushion frame is restored.

6. The back reclining apparatus according to claim 1, wherein the cushion locking unit includes:
   a cushion locking bar formed at a rear end of the cushion frame; and
   a cushion locking bracket provided at a lower end of the reclining frame to selectively lock with the cushion locking bar.

7. The back reclining apparatus according to claim 6, wherein the cushion locking unit further includes a folding operation portion folding the back frame around a back folding hinge by releasing locking of the cushion locking bracket from the cushion locking bar through operation of the cushion locking bracket.

8. The back reclining apparatus according to claim 7, wherein the folding operation portion includes:
   a spring release that is pulled backward when a folding lever is operated;
   a folding release bracket pivotally connected to the spring release through a bracket shaft to rotate upward together with the bracket shaft when the spring release is pulled backward; and
   a folding wire having one end connected to the folding release bracket and the other end connected to the cushion locking bracket.

* * * * *